Jan. 23, 1934.　　　　G. C. LEWIS　　　　1,944,715
MANUFACTURE OF CARBON BLACK
Filed June 28, 1930
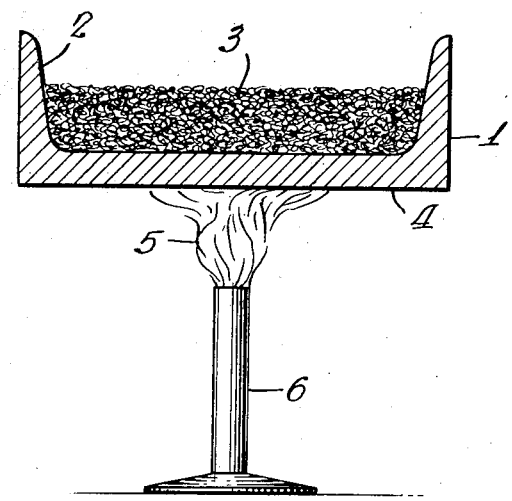
INVENTOR
*George Charles Lewis*
BY
*Sean, Fairbank, Hitch, Foster*
ATTORNEY Patented Jan. 23, 1934

1,944,715

UNITED STATES PATENT OFFICE 1,944,715

MANUFACTURE OF CARBON BLACK

George Charles Lewis, New Dorp, N. Y., assignor to Columbian Carbon Company, New York, N. Y., a corporation of Delaware Application June 28, 1930. Serial No. 464,508

6 Claims. (Cl. 134—60)

This invention relates to the art of producing carbon black, and more particularly to a process and apparatus whereby a greater yield of carbon black having more desirable characteristics is obtained.

Carbon black is commonly manufactured by impinging a hydrocarbon flame on a metallic surface and scraping off the carbon deposited thereon. These metallic surfaces usually take the form of channel irons, iron plates or iron rollers.

In accordance with the present invention, it is found that by maintaining the metallic depository surface at a higher temperature than the temperature which is produced as a result of the impingement of the hydrocarbon flame on a freely radiating metallic depository, a greater yield of carbon black is produced having better quality characteristics. In accordance with the present invention, it is preferred to maintain the temperature as high as possible. In any case, however, it is advisable not to permit the depository surface to attain a temperature of red heat.

Any suitable means may be provided for maintaining the depository surface at such higher temperatures. For this purpose, for instance, there may be employed the heat of burning gas, or the use of electrical energy on portion of that part of the metallic depository which is not acted upon by the impinging hydrocarbon flame. A more economical and preferable way of maintaining the heat of the metallic depository at a higher temperature, however, is effected by checking the radiation of the heat from some of those portions of the depository which are not acted upon by the impinging flame. This can be accomplished by disposing a layer of insulating or slow radiating material such as fire clay, ceramic cements, asbestos and the like, on the upper or top surface of a metal plate and impinging a hydrocarbon flame on the bottom surface. This checking of the heat radiation maintains said metallic depository at a higher temperature than the temperature resulting from the mere application of the hydrocarbon flame on an uninsulated depository. Through the use of this insulating material, a greater yield of carbon black is produced having a much better quality than that ordinarily manufactured.

The invention further consists in the new and novel features of operation, and the new and original arrangements and combinations of steps in the process as well as original features of construction and combination of parts hereinafter set forth and claimed.

In the accompanying drawing there is shown in elevation with parts in section for purposes of illustration one apparatus by means of which the present process may be carried on.

In accordance with the present invention, a hydrocarbon flame is impinged on a metallic depository which may take the form of a channel plate or roller. This metallic depository may be heated by adding non-carbon forming heat units thereto, such as electrical energy or the application of heat from a non-carbon forming flame. However, it is preferred to maintain the metallic depository at a high temperature by checking the radiation of heat from those portions of the depository which are not acted upon by the hydrocarbon flame. For this purpose, there is shown in the accompanying drawing a channel iron 1, having a trough 2, in which is disposed a layer of insulating or slow radiating material 3, such as fireclay, ceramic cements, asbestos and the like. The depository surface 4, of said channel has impinged thereon a hydrocarbon flame 5 emitted from a suitable burner 6. The heat generated by said hydrocarbon flame is somewhat prevented from radiating from the unimpinged exposed surfaces of the channel so that said channel is permitted to retain a greater portion of the heat applied thereto. Through the use of this insulating material, a greater yield of carbon black is produced having more desirable characteristics.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

Having thus described my invention, what I claim as new and desire to secure by Letters Patent is:

1. The process of manufacturing carbon black which includes the step of impinging a hydrocarbon flame on a metallic depository having a layer of insulating material selected from the group consisting of fireclay, ceramic cements, and asbestos, on some of the unimpinged portions of said depository.

2. An apparatus for manufacturing carbon black including a metallic plate, means for impinging a hydrocarbon flame on said metallic plate, and a layer of non-volatile insulating material disposed on the other side of said metallic plate.

3. An apparatus for manufacturing carbon black including an iron channel, means for impinging a hydrocarbon flame on the outside of said channel, and a layer of non-volatile insulating material disposed in the trough defined by said channel.

4. An apparatus for manufacturing carbon black, including a metal channel extending substantially horizontally and having upwardly extending side flanges, a burner disposed therebeneath for impinging a hydrocarbon flame on the underside of the channel, and non-volatile solid insulation upon the upper side of the channel and between said flanges for retarding heat radiation from the channel.

5. In a carbon black apparatus, a metallic collector, a burner cooperating with the collector to deposit carbon black thereon and acting to heat said collector, and a layer of solid non-volatile insulating material disposed on the collector at the side thereof opposite to said burner for retarding heat radiation from said collector.

6. An apparatus for manufacturing carbon black, including a metallic plate, means for impinging a hydrocarbon flame on one side of said plate, and a layer of non-volatile solid insulating material on the other side of said plate for checking the heat radiation therefrom.

GEORGE CHARLES LEWIS.